United States Patent
Shand et al.

(10) Patent No.: US 7,697,416 B2
(45) Date of Patent: *Apr. 13, 2010

(54) CONSTRUCTING A REPAIR PATH IN THE EVENT OF NON-AVAILABILITY OF A ROUTING DOMAIN

(75) Inventors: Mike Shand, Cobham (GB); Stewart F. Bryant, Merstham (GB); David D. Ward, Los Gatos, CA (US); Gargi Nalawade, San Jose, CA (US); Robert Raszuk, Komorow (PL); Keyur Patel, San Jose, CA (US); Clarence Filsfils, Brussels (BE); Stefano B. Previdi, Rome (IT)

(73) Assignee: Cisco Technolgy, Inc., San Jose, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/518,382

(22) Filed: Sep. 8, 2006

(65) Prior Publication Data

US 2008/0062861 A1     Mar. 13, 2008

(51) Int. Cl.
*H04L 1/00*    (2006.01)
*H04L 12/26*    (2006.01)
*H04L 12/28*    (2006.01)
*H04L 12/56*    (2006.01)

(52) U.S. Cl. .................. 370/216; 370/217; 370/242; 370/389; 370/392

(58) Field of Classification Search ............... 370/216, 370/217, 242, 389, 392
See application file for complete search history.

(56) References Cited

U.S. PATENT DOCUMENTS

| | | | |
|---|---|---|---|
| 6,032,194 A * | 2/2000 | Gai et al. ................. 709/239 |
| 6,148,410 A | 11/2000 | Baskey et al. |
| 6,438,100 B1 | 8/2002 | Halpern et al. |
| 6,697,325 B1 | 2/2004 | Cain |
| 6,934,763 B2 | 8/2005 | Kubota et al. |
| 6,944,131 B2 | 9/2005 | Beshai et al. |
| 7,177,295 B1 * | 2/2007 | Sholander et al. ........... 370/338 |
| 7,181,533 B2 | 2/2007 | D'Souza et al. |
| 7,209,975 B1 | 4/2007 | Zang et al. |
| 7,355,983 B2 | 4/2008 | Scudder et al. |

(Continued)

OTHER PUBLICATIONS

Anonymous, "IS-IS, Intermediate System-to-Intermediate System, ISO 10589," NetworkSorcery.com, downloaded May 21, 2007, pp. 1-4.

(Continued)

*Primary Examiner*—Chi H Pham
*Assistant Examiner*—Farah Faroul
(74) *Attorney, Agent, or Firm*—Hickman Palermo Truong & Becker LLP

(57) ABSTRACT

In one embodiment, an apparatus and method are described for constructing a repair path in the event of non-availability of a routing domain component of a routing domain comprising, as components, links and nodes. The apparatus is arranged to receive respective network repair addresses from each of the far-side and near-side advertising node for use in the event of non-availability of a routing domain component between the advertising node. The apparatus is further arranged to advertise the near-side advertising node network repair address to one or more far-side nodes via a path external to the routing domain.

26 Claims, 6 Drawing Sheets

U.S. PATENT DOCUMENTS

| | | | |
|---|---|---|---|
| 7,359,393 | B1 | 4/2008 | Nalawade et al. |
| 7,406,035 | B2 | 7/2008 | Harvey et al. |
| 7,408,941 | B2 | 8/2008 | Martini et al. |
| 7,502,332 | B1 | 3/2009 | Chen |
| 7,519,009 | B2 * | 4/2009 | Fleischman ............... 370/254 |
| 7,535,826 | B1 | 5/2009 | Cole et al. |
| 2002/0093954 | A1 * | 7/2002 | Weil et al. ............... 370/389 |
| 2003/0007500 | A1 * | 1/2003 | Rombeaut et al. ......... 370/433 |
| 2003/0142682 | A1 | 7/2003 | Bressoud et al. |
| 2003/0233595 | A1 | 12/2003 | Charny et al. |
| 2004/0205239 | A1 | 10/2004 | Doshi et al. |
| 2004/0213233 | A1 | 10/2004 | Hong et al. |
| 2004/0260825 | A1 | 12/2004 | Agarwal et al. |
| 2005/0007950 | A1 * | 1/2005 | Liu ............................ 370/221 |
| 2005/0068968 | A1 * | 3/2005 | Ovadia et al. ............. 370/396 |
| 2006/0140190 | A1 | 6/2006 | Lee |
| 2006/0187819 | A1 | 8/2006 | Bryant et al. |
| 2006/0193247 | A1 | 8/2006 | Naseh et al. |
| 2006/0193252 | A1 * | 8/2006 | Naseh et al. ............... 370/225 |
| 2006/0209716 | A1 | 9/2006 | Previdi et al. |
| 2006/0239201 | A1 | 10/2006 | Metzger et al. |
| 2006/0291446 | A1 * | 12/2006 | Caldwell et al. ........... 370/351 |
| 2007/0005784 | A1 * | 1/2007 | Hares et al. ................ 709/230 |
| 2007/0011351 | A1 * | 1/2007 | Bruno et al. ............... 709/238 |
| 2007/0025270 | A1 | 2/2007 | Sylvain |
| 2007/0041379 | A1 | 2/2007 | Previdi et al. |
| 2007/0091793 | A1 * | 4/2007 | Filsfils et al. .............. 370/228 |
| 2007/0091794 | A1 * | 4/2007 | Filsfils et al. .............. 370/228 |
| 2007/0091795 | A1 * | 4/2007 | Bonaventure et al. ...... 370/228 |
| 2007/0091796 | A1 | 4/2007 | Filsfils et al. |
| 2007/0180311 | A1 | 8/2007 | Harvey et al. |
| 2007/0214280 | A1 | 9/2007 | Patel et al. |
| 2007/0260746 | A1 | 11/2007 | Mirtorabi et al. |
| 2008/0008104 | A1 | 1/2008 | Previdi et al. |
| 2008/0062986 | A1 * | 3/2008 | Shand et al. ............... 370/392 |
| 2008/0192627 | A1 * | 8/2008 | Lichtwald .................. 370/228 |
| 2008/0219153 | A1 * | 9/2008 | Shand et al. ............... 370/225 |
| 2008/0317055 | A1 | 12/2008 | Zetterlund et al. |
| 2009/0129771 | A1 | 5/2009 | Saniee et al. |

OTHER PUBLICATIONS

R. Callon, "Use of OSI IS-IS for Routing in TCP/IP and Dual Environments," Internet Engineering Task Force (IETF) Request for Comments (RFC) 1195, Dec. 1990, pp. 1-70.

D. Oran, "OSI IS-IS Intra-domain Routing Protocol" [republication of ISO 10589], IETF RFC 1142, Feb. 1990, 179 pages (see esp. pp. 21-24).

Y. Rekhter et al., "A Border Gateway Protocol 4 (BGP-4)," IETF RFC 1771, Mar. 1995, pp. 1-47.

European Patent Office, "Supplementary European Search Report", application No. EP 06720965, dated Jul. 21, 2009, 6 pages.

Claims, application No. EP 06720965, 4 pages.

State Intellectual Property Office of the People'S Republic of China, "The First Office Action", filing No. 200680001652.0, May 8, 2009, 15 pages.

Claims, filing No. 200680001652.0, 4 pages.

\* cited by examiner

CONSTRUCTING A REPAIR PATH IN THE EVENT OF NON-AVAILABILITY OF A ROUTING DOMAIN

FIELD OF THE INVENTION

The present disclosure generally relates to construction of repair paths in routing protocols.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One routing protocol used, for example, in the internet is Border Gateway Protocol (BGP). BGP is used to route data between routing domains such as autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Edge or border BGP routers in a first AS communicate with eBGP peers in a second AS via exterior BGP (eBGP). In addition BGP routers within an AS exchange reachability information using interior BGP (iBGP). As a very large number of routes may be advertised in this manner an additional network component comprising a route reflector is commonly provided which sets up a session with each BGP router and distributes reachability information to each other BGP router.

The border routers in respective AS's can advertise to one another, using eBGP, the prefixes (network destinations) reachable from them, the advertisements carrying information such as AS-path, indicating the AS's through which the route advertisement has passed including the AS in which the advertising border router itself is located, and a BGP Community attribute indicating the manner in which the advertisement is to be propagated. For example if an eBGP advertisement is received with Community attribute No-Advertise, then the border router receiving the advertisement does not advertise the route information to any of its peers, including other routers in its AS. When the routes are advertised internally, additional information such as a local preference and a nexthop field are included. The local preference attribute sets a preference value to use of that particular route for example for a given set of prefixes such that where more than one route is available to other border routers in the AS they will select the route with the highest local preference. The next-hop attribute provides the IP address used for the link between the border router in the AS and its eBGP peer.

To reduce the amount of iBGP messages further, route reflectors may only advertise the best path for a given destination to all border routers in an AS. Accordingly all border routers will forward traffic for a given destination to the border router identified in the best path advertisement. Forwarding of packets within the AS may then simply use Interior Gateway Protocol (IGP) as described in more detail below where the IGP forwarding table will ensure that packets destined for the eventual destination will be forwarded within the AS towards the appropriate border router. Alternatively an ingress border router receiving incoming packets may tunnel the packets to the appropriate egress border router, that is, encapsulate the packets to a destination egress border router for transit across the AS for example using IP or MPLS tunnels. The packets are then decapsulated at the egress border router and forwarded according to the packet destination header.

Within each AS the routing protocol typically comprises an interior gateway protocol (IGP) for example a link state protocol such as open shortest path first (OSPF) or intermediate system—intermediate system (IS-IS).

The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) or link state advertisement (LSA) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

According to the approach described in Shand et al "not-via" addresses are used in a manner which can be understood with reference to FIG. 1 which is a schematic diagram showing an autonomous system network 100. The network includes nodes S and P, reference numerals 102, 104 which are joined by a link 106. Node S is connected to nodes B and D, reference numerals 108, 110, by links 112, 114 respectively. Nodes B and D are connected to nodes A and C respectively, reference numerals 116, 118 by links 120, 122 respectively. Node P is connected to nodes E and G, reference numerals 124, 126 via links 128, 130 respectively and nodes E and G are connected to respective nodes F and H, reference numerals 128, 130 via respective links 132, 134.

In order to repair a failure in the network each node adjacent to the failure acting as instigating repair node computes a repair or backup path around the failure. Then when a failure is detected an instigating repair node will forward subsequent packets which otherwise would have traversed the failure, via the repair path to a receiving repair node. For example where link 106 fails between node S and P and node S detects the failure then packets subsequently received for node E, F, G or H, which otherwise would have gone via link 106, are forwarded according to the pre-computed repair path (using connectivity not shown in FIG. 1). This approach is sometimes termed fast reroute. The manner in which the repair path is constructed and propagated is by giving each node/interface (ie its connection to each link to adjacent nodes), in addition to its normal address, a propagatable repair address which is reachable via a repair path notvia the failure component, the "notvia address". For example node P may have repair addresses P notvia S (represented here as Ps). Each other node will have computed its nexthop for each of the notvia addresses. Hence when node S detects failure of link 106 it tunnels subsequent packets for node P to address Ps. Its nexthop, having precomputed its nexthop for Ps will forward accordingly and so forth. It will be noted that node S can forward the packet to Ps in any appropriate way for example by tunneling it to that address. Similarly any packets received at node S for node E, F, G, H will also be tunneled to Ps. Upon decapsulation of the packet at node P it will then be forwarded normally from node P to node E, F, G or H as appropriate following the original path.

Shand et al further discloses various manners of reducing the SPF calculation overhead using incremental iSPF. Incremental SPF's will be well known to the skilled reader and are not described in detail here but merely summarized for the purposes of explanation. In particular as a first step, only a partial SPF is computed for the not-via address once the SPT branch attached to the failed component has been excised. All addresses no longer attached are recomputed and reattached, however the incremental calculation is terminated when all of the addresses previously reached via the affected component are reattached. A further advantage is achieved according to Shand et al by ensuring that, whilst a repairing node upon detecting a failure affecting an incoming packet for a normal address will tunnel that packet to a not-via address, it will not attempt to repair an incoming packet itself already destined for a not-via address, that is, a packet that has already been repaired. In particular this provides a loop prevention strategy for example where two nodes adjacent a failure might otherwise try to repair a packet which could cause it to loop back and forth between them. According to the approach described in Shand et al the repairing node can continue to tunnel packets to a not-via address until the network has reconverged at which point the repairing node can revert to normal forwarding.

It is important to minimize packet loss in the case of network component failure, both intra-domain (IGP) and inter-domain (eBGP). For example in the case of intra-domain link failure, ISPs use various techniques to react quickly to the failure while convergence is taking place including handling of the failure by other layers or implementing fast reroute techniques for example of the type described in co-pending patent application Ser. No. 11/064,275, filed Feb. 22$^{nd}$, 2005, entitled "Method and Apparatus for Constructing a Repair Path Around a Non-Available Component in a Data Communications Network" of Mike Shand et al, ("Shand et al"), the entire contents of which are incorporated by reference for all purposes as if fully set forth herein.

However problems arise with existing approaches when a failure partitions an IGP domain such as an autonomous system. Partitioning of the autonomous system occurs when a failure means that there is no path from one side of the failure to the other, sometimes termed a "single point of failure". For example in such circumstances, using the approach described in Shand et al it is no longer possible to reach destinations in one partition from the other when repair is implemented as the computation of the FIB entries for not-via addresses will be unable to find a route across the partition. Importantly, it is also no longer possible to forward transit traffic, that is inter-AS traffic through the AS. One approach to this problem is described in International Standard ISO/IEC10589 which describes a method of partition repair for intermediate system-intermediate system (IS-IS) as IGP where a partition in a level 1 area is repaired using the level 2 domain. However there is no mechanism for repair of the level 2 domain itself.

BRIEF DESCRIPTION OF THE DRAWINGS

The present invention is illustrated by way of example, and not by way of limitation, in the figures of the accompanying drawings and in which like reference numeral refer to similar elements and in which.

DESCRIPTION OF EXAMPLE EMBODIMENT

A method and apparatus for constructing a backup path in a routing domain is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a repair path in the event of non-availability of a routing domain component
4.0 Implementation Mechanisms-Hardware Overview
5.0 Extensions and Alternative 1.0 General Overview The needs identified in the foregoing background and other needs and objects that will become apparent from the following description, are achieved in the present invention, which comprises, in one aspect, an apparatus for constructing a repair path in the event of non-availability of a routing domain component of a routing domain comprising, as components, links and nodes. The apparatus is arranged to receive respective network repair addresses from each of a far-side and near-side advertising node for use in the event of non-availability of a routing domain component between the advertising nodes. The apparatus is further arranged to advertise the near-side advertising node network repair address to one or more far-side nodes via a path external to a routing domain.

In other aspects, the invention encompasses a computer apparatus and a computer-readable medium configured to carry out the foregoing steps.

2.0 Structural and Functional Overview

Figure 1:
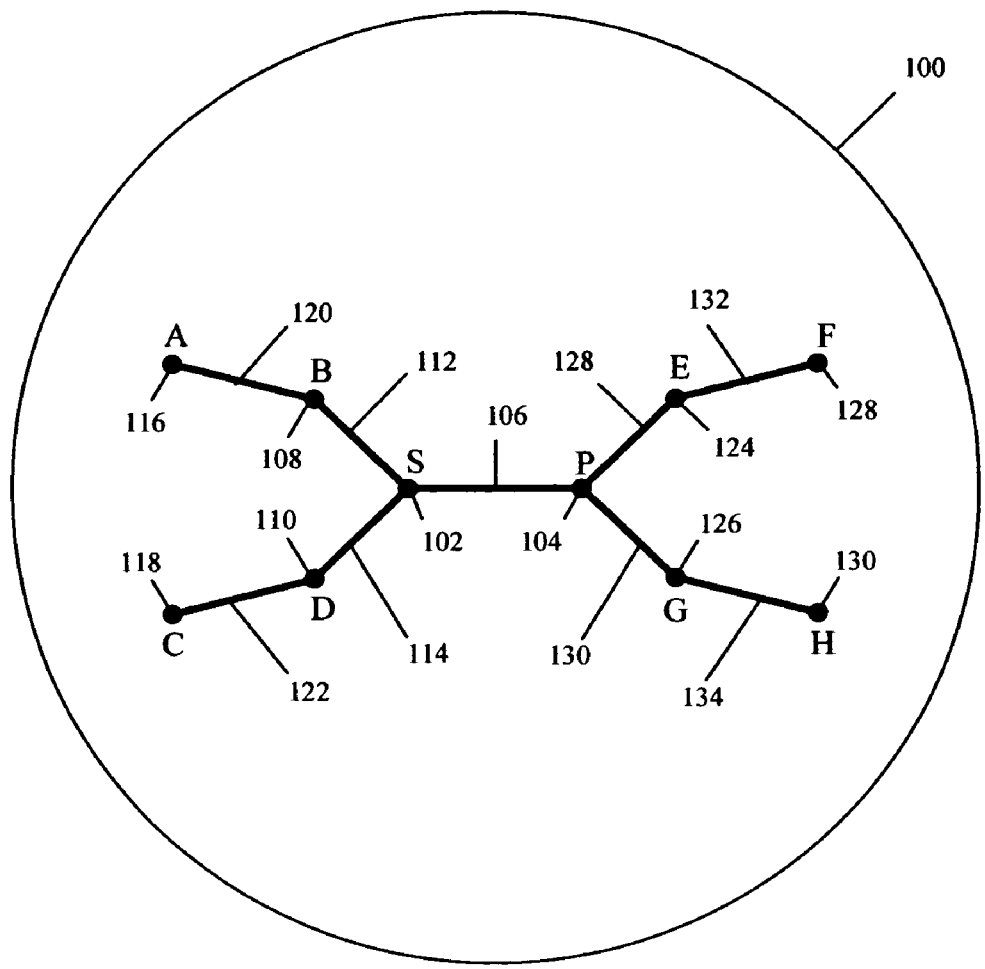
FIG. 1 is a schematic representation of a partitionable autonomous system.

FIG. 1 is a schematic representation of a partitionable autonomous system. It will be seen that assuming that all connectivity is in fact showing link 106 joining nodes S and P comprises a single point of failure such that if the node fails there will be no path for packets between nodes A, B, C, D and S on the one hand and nodes P, E, F, G at H on the other hand, partitioning the network. As a result when nodes S and P advertise their respective not-via addresses for use in the case of the failure of link 106, the nodes on the other side of the partition will be unable to compute a route across the partition. It will further be noted that a similar problem will arise in the case of failure of nodes S or P themselves (as well as, in the absence of further connectivity, various other of the nodes in the network). As a result, if a failure does occur that partitions the network then, according to the approach in Shand et al the packet is dropped when it reaches a node adjacent to the partition.

Figure 2:
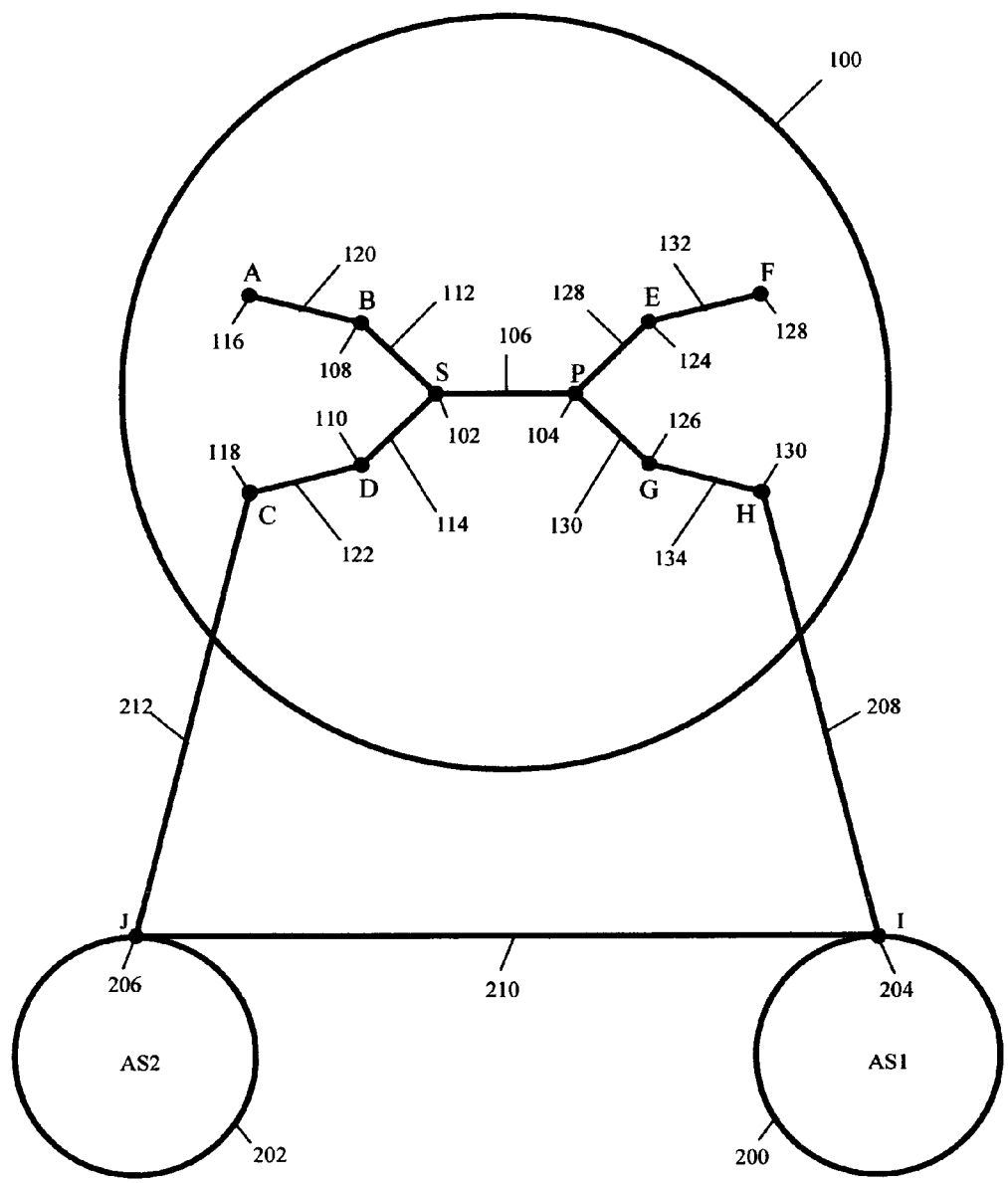
FIG. 2 is a representation of a network according to the present approach allowing repair of a partitionable autonomous system.

In overview the method described herein is performed on an apparatus comprising a node or router such as an ASBR as can be further understood with reference to FIG. 2 which depicts a network to which the method may be applied. The network of FIG. 2 comprises a routing domain such as an AS corresponding to AS 100 described above with reference to FIG. 1 although it will be appreciated that the method can be applied in the case of any appropriate network. Common reference numerals are adopted where appropriate to avoid duplication. The network of FIG. 2 further includes additional ASs AS1 and AS2, reference numerals 200, 202. The ASs may include multiple nodes but for the purposes of simplicity only ASBR I, reference numeral 204 is shown in AS1 and ASBR J, reference numeral 206, is shown in AS2. ASBR H in AS100 communicates with ASBR I via link 208, ASBRs I and J communicate via link 210 and ASBRs J and C communicate via link 212. It will be appreciated that additional connectivity may in fact be provided. For example further ASs may be included and inter-AS paths may include additional intra AS paths. For example AS1 may provide a path between ASBR's H and J via ASBR I which can communicate via IGP with a further ASBR in AS1 providing connectivity to ASBR J.

In the event of non-availability of a component in AS100 such as link 106, partitioning AS100, the approach described herein allows construction of a repair path using a path external to the AS100 for example via ASs AS1 and AS2. For example ASBR H may act as an apparatus for constructing the repair path, receiving respective network repair addresses such as not-via addresses Sp, Ps meaning S notvia P and P notvia S from nodes S and P respectively acting as far-side and near-side advertising nodes relative to the partition. Using normal IGP repair it will be seen, for example, that none of nodes E, F, G, H or indeed P would be able to compute a route for not-via address Sp as failure of link 106 partitions the network. Similarly none of nodes A, B, C, D or S can compute a route for not-via address Ps.

However if, for example, ASBR node H has a path to ASBR node C external to the AS (for example via nodes AS1, AS2) then an appropriate path can be constructed. In particular node H, having received not-via address Sp from far-side node S relative to the partition and not-via address Ps from near-side node P, can advertise the near-side repair address Ps using eBGP to node C via ASs AS1 and AS2. Hence not-via addresses corresponding to failure conditions which, would partition the AS are advertised into BGP from one potential partition and reimported into the IGP in the other potential partition thus allowing a repair tunnel to be constructed across the failure via one or more external ASs.

Figure 3:
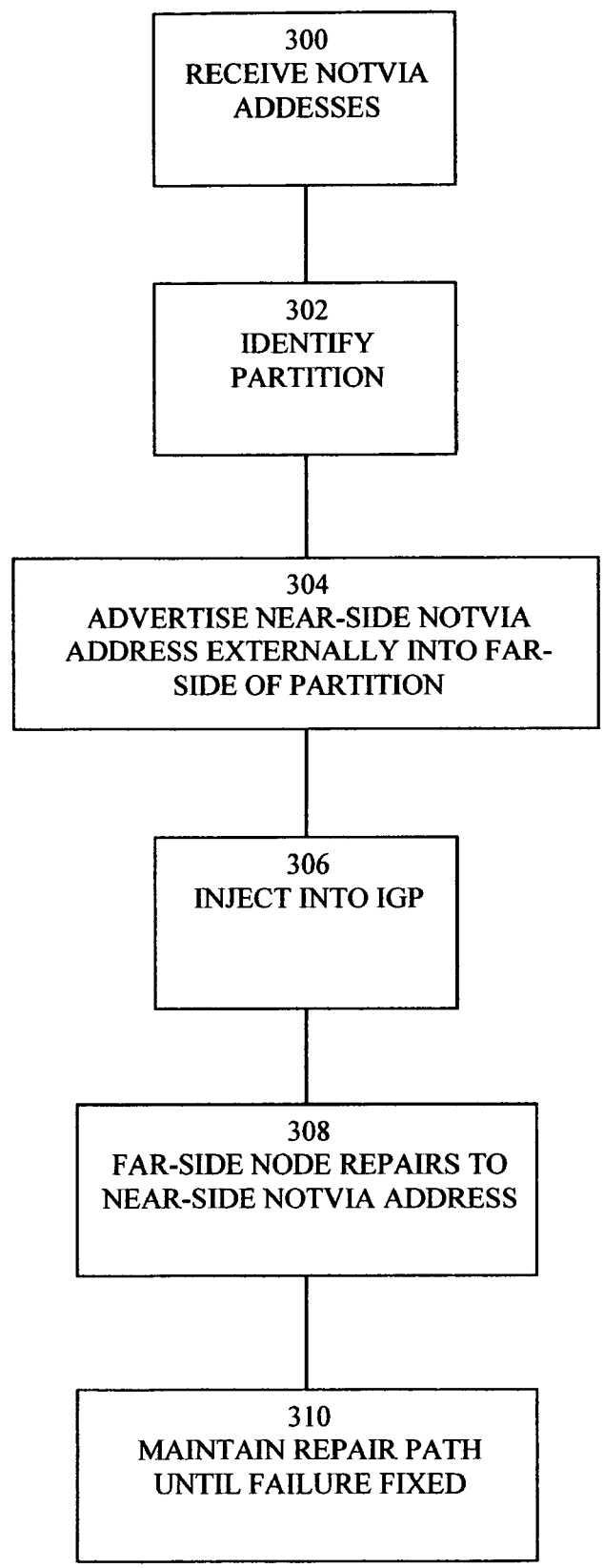
FIG. 3 is a high level flow diagram illustrating steps performed according to the method described herein.

The approach can be understood further with reference to FIG. 3 which is a flow diagram illustrating at a high level the steps performed. At step 300 a node such as ASBR H receives not-via addresses from other nodes in the network. At step 302 the node optimally identifies whether the network would be partitioned in the event of non-availability of the AS component in relation to which the not-via address is advertised, for example by computing an SPF and identifying whether nodes in the AS are unreachable in that case.

If a partition is identified then at step 304 ASBR H advertises the near-side not-via address (for example Ps) via EBGP into the far-side of the partition. At step 306 ASBR C on the far-side of the potential partition, upon receipt of the advertisement for Ps, injects the address Ps into the IGP on the far-side. It will be noted that, by symmetry, the operation will be implemented in reverse such that not-via address Sp is received by ASBR H from ASBR C and injected into IGP.

At step 308, upon failure of link 106, node S will repair to not-via address Ps, in particular by tunneling packets that would have traversed link 106 to Ps and hence towards ASBR C. The tunneled packets are tunneled via the path external to AS100, namely ASs AS2, AS1 to ASBR H. When the tunneled packet reaches node P it is decapsulated and forwarded normally along its subsequent route which may involve back tracking. At step 310 the repair path is maintained until the failure is fixed—it will be noted that even once the AS100 has converged, as the failure represents a single point of failure, the repair path must be retained until the physical problem with the failed component is repaired or additional connectivity is introduced.

It will be appreciated that the approach described above can be implemented both in the case of link repair (for example failure of link 106), or node repair (for example failure of nodes S and P) where failure of any of those components would partition the AS. It will further be noted that ASBRs can advertise not-via addresses other than partition-related not-via addresses into external paths, if scalability of the approach is not an issue. Further optimizations are described in more detail below.

As a result of the arrangement set out and in particular the use of BGP connectivity external to the AS, any IGP partition can be dealt with.

Figure 4:
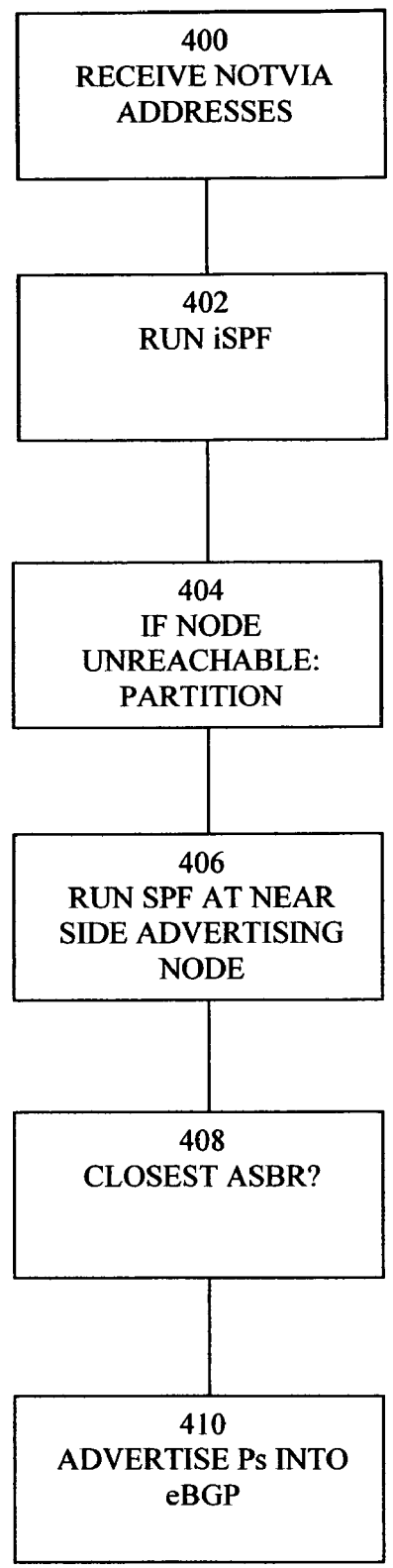
FIG. 4 is a flow diagram showing in more detail steps performed at a nearside ASBR according to the present approach.
Figure 5:
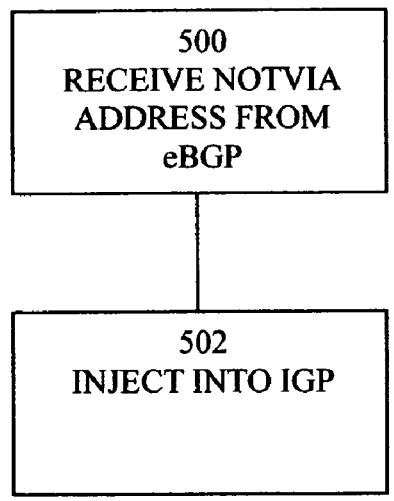
FIG. 5 is a flow diagram illustrating in more detail steps performed at a far-side ASBR according to the present approach.
Figure 6:
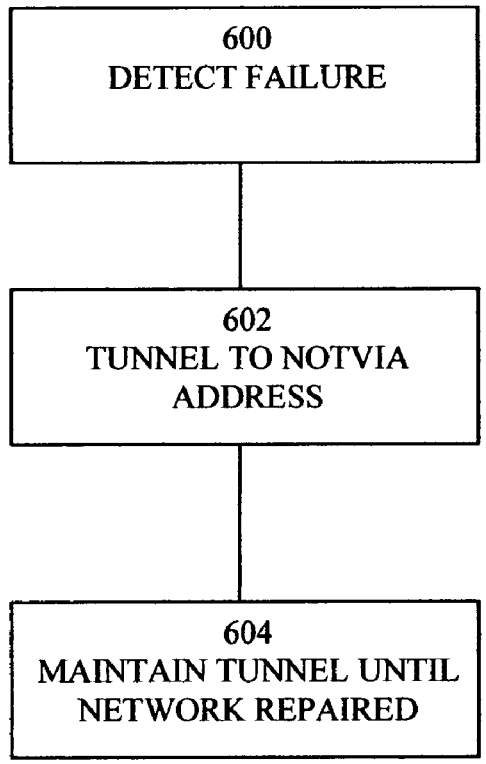
FIG. 6 is a flow diagram illustrating in more detail steps performed at a repairing node according to the present approach.

3.0 Method of Constructing a Repair Path in the Event of Non-Availability of a Routing Domain Component The approaches described herein can be further understood with reference to FIGS. 4, 5 and 6 which are flow diagrams showing in more detail, respectively, the steps implemented at an advertising or near-side ASBR, at a far-side ASBR and at a repairing node such as node S or P.

Turning firstly to FIG. 4, the steps performed for example at ASBR H can be understood in more detail. At step 400 the ASBR receives LSPs or LSAs containing not-via addresses including Sp and Ps. At step 402 to identify whether a corresponding failure would partition the network ASBR H runs an incremental SPF (iSPF) to compute the not-via path and, if one of the nodes joined by the failed component is unreachable, then at step 404 a partition is identified.

It is noted that it is explicitly the reachability of the node itself and not its not-via address that is checked. For example node H identifies that node S is unreachable when link 106 fails, rather than identifying that not-via address Sp is unreachable as this not-via address may be injected back into node H's IGP by ASBR C. As an optional optimization, measures can be implemented in order to limit the number of ASBR's in each potential partition which needs to advertise not-via addresses in BGP. In particular each ASBR which has determined that it should advertise a not-via address Ps can run an additional SPF rooted at the near-side advertising node (for example node P in the example above) at step 406 with the corresponding link 106 failed. At step 408, if the ASBR running the SPF is found to be the closest capable ASBR to the near-side advertising node then it may elect to be the only node that performs the following steps and more remote ASBRs need not perform the following steps. Some form of tie-breaking mechanism may be implemented in the case of two ASBR's being found to be equally close to the near-side advertising node, for example taking into account the number of AS hops needed in any path external to the AS.

Assuming the absence of unidirectional links, it is known that if far-side node S cannot be reached via the link connecting it with near-side node P then P will also be unable to reach node S in its not-via calculation, as well as all routers on the near-side of the potential partition at link 106. Hence all near-side ASBRs including ASBR H will determine that they are unable to reach node S from their not-via computations and, from this, infer the converse that node S cannot reach node P. However the ASBR is selected, at step 410 the ASBR advertises the near-side not-via address into eBGP. If there are unidirectional links, then a reverse SPF at the ASBR can be run allowing the node to compute the reachability in the correct direction.

The eBGP path selected may simply traverse only a single external AS or may traverse multiple additional ASs. The external path may pass only through an ASBR or may traverse an AS. Since the not-via addresses are only required for relatively local repair across an AS partition, in an optional optimization the scope of the distribution of the not-via addresses can be limited. For example the number of AS's traversed in the external path can be limited using an attribute such as AS_HOPCOUNT setting the maximum number of AS's which can be included in the external path. Alternatively or in addition the community attribute can be used (AS_TYPE) can make the granularity finer and restrict advertisement using specific community values such an NO EXPORT, NO ADVERTISE. Alternatively, the BGP Extended Communities Attribute can identify which routes need to be imported. This mechanism would be used to allow an exporting AS to specify a set of ASs that should use the routing information to build the repair. The information would not be propagated outside the community thus reducing its scope. This mechanism also allows ASBRs to determine that although this is one of their own addresses they SHOULD import it to the AS—something that is not normally done (because an AS tries to deliver its own traffic locally and NOT using the external net). Furthermore, advertisement of the not-via addresses back into IGP at the far-side of the partition can be, optionally, facilitated by assigning a specific commentary attribute AS TYPE to allow such addresses to be recognized by a receiving ASBR and announced back into the IGP of the far-side of the partitioned AS.

If the "truncated" iSPF optimization discussed in Shand et al is implemented then appropriate steps can be taken to ensure that this is not adversely affected by the approaches described herein. According to this approach, when performing the iSPF for a not-via address, the sub-tree attached to the failed component is detached and the iSPF is terminated as soon as the not-via address has been reattached. In the scenario addressed by the present approach, there is no reattachment because the failed component was a single point of failure meaning that the iSPF will go on looking for reattachment until it has explored the whole network, and still not find it. However the approach described above problem allows termination as the not-via address or corresponding node prefix is reintroduced from the far-side ASBR and hence the not-via address can be re-attached via the far-side ASBR. This is equivalent to performing a "partial" or "leaf reattachment" SPF and reattaching the not-via address via the ASBR. AR nodes in the AS carrying out the computation can be configured with the software or hardware to recognize the slightly more complex form of the not-via computation in the case that a truncated iSPF optimization is implemented.

Once the near-side ASBR has implemented the approach described with reference to FIG. 4 and in particular advertised the near-side not-via address into eBGP it can be seen that the address is propagated via AS1 and AS2 to far-side ASBR C. The steps performed by the far-side ASBR C are described in more detail in FIG. 5. In particular at step 500 ASBR C receives the not-via address from eBGP and at step 502 ASBR C injects the not-via address into the far-side IGP exactly as though it were any other address coming through eBGP. If the address belongs to the AS and contains the AS_TYPE community, the address must only be advertised in iBGP by nodes on the far side of the failure and injected into the IGP. If the notvia address does NOT belong to the AS, it is treated exactly like any other address. Within the AS that contains the endpoint it must only be advertised in IBGP by nodes on the far side of the failure.

Once the not-via address has been injected into the IGP, all of the far-side nodes compute their routes for the not-via address Ps, for example, and in particular will compute their next-hop towards ASBR C. In particular, node S on the far-side of the partition will compute its next-hop for packets that previously would have traversed the failed component 106 and, in the topology shown, will identify node D as its next-hop to address Ps. The manner in which node S's repairing node operates once the failure occurs can be further understood with reference to FIG. 6.

At step 600, when an actual failure occurs the repairing node, for example node S detects the failure and at step 602 tunnels the traffic which previously flowed across the failure to the not-via address of the far-side of the failure, Ps, as usual. However in this case the tunnel runs outside the AS via ASBR C. As the failure comprises a single point of failure, reconvergence of the network will not deliver a path across the partition such that the repair tunnel must be kept in place until the network is physically repaired.

It will be noted that in the presence of multiple failures each of which partition the network, the mechanism described herein may not be able to provide a repair but will not result in looping repairs because a packet addressed to a not-via address is never repaired as described in Shand et al, and summarised above.

Although the discussion above is principally directed towards repair of link failure such as failure of link 106, it will be appreciated that the same approach can be implemented in relation to node failure, for example repair in relation to failure of node S or P, either of which failures would represent a single point of failure partitioning the network. The considerations set out in Shand et al applying to node repair apply equally here, of course, for example ensuring that packets are repaired to the appropriate neighbour of the failed node.

It will be appreciated that the approaches described herein can be implemented in any appropriate manner and on any appropriate platform, and the various steps described implemented in any appropriate manner for example in hardware, software or firmware. For example the approach can be implemented in any router code base supporting BGP and IS-IS or OSPF.

The addresses assigned as notvia addresses can be any appropriate addresses for example taken from a private address space for the network.

Any appropriate encapsulation may be used to carry a notvia repair, for example IP in IP, GRE or L2TPv3. Similarly any alternate encapsulation scheme can be adopted as long as the encapsulating router and the router to which the encapsulated packet is addressed as repair point have a common ability to process the chosen encapsulation type.

4.0 Implementation Mechanisms—Hardware Overview

Figure 7:
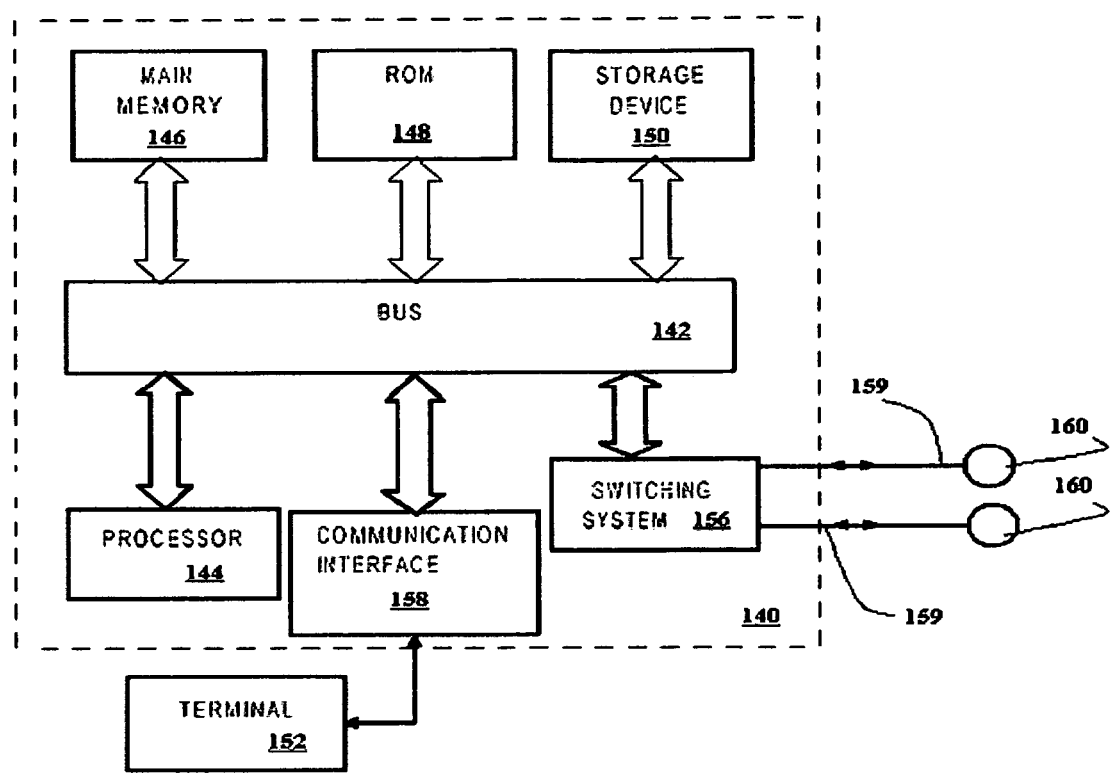
FIG. 7 is a block diagram that illustrates a computer system upon which the approach described herein may be implemented.

FIG. 7 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as an ASBR or repairing nodes the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

It will further be appreciated that an apparatus for performing the method can be considered to be any single node such as an ASBR, repairing node or other router, the combination of such nodes, an AS or multiple ASs as appropriate. The routing domain may comprise an autonomous system, SRLG or LAN, or any other network of interconnected components sharing a common routing paradigm.

Where reference is made to BGP, eBGP or iBGP it will be appreciated that the approach can be applied in relation to any appropriate exterior or inter-domain protocol.

What is claimed is:

1. An apparatus for constructing a repair path in the event of non-availability of a component of a first routing domain comprising, as components, links and nodes, the apparatus comprising:
   one or more processors; and a network interface communicatively coupled to the one or more processors and configured to communicate one or more packet flows among the one or more processors in a network; and
   a non-statutory computer readable storage medium comprising one or more sequences of instructions for constructing a repair path which, when executed by the one or more processors, cause the one or more processors to perform:
   in the event of non-availability of the routing domain component between a first advertising node and a second advertising node, receiving a first network repair address from the first advertising node and a second network repair address from the second advertising node;
   determine an external path that comprises an external node that resides in a second routing domain that is external to the first routing domain; and
   advertising the second network repair address to one or more nodes coupled to the first advertising node via the external path.

2. An apparatus as claimed in claim 1 in which the non-available component comprises a node or a link.

3. An apparatus as claimed in claim 1 in which, in the event of non-availability of the routing domain component the first routing domain is partitioned into far-side components unreachable from the apparatus by a path within the routing domain and near-side components reachable from the apparatus by a path within the first routing domain.

4. An apparatus as claimed in claim 3, wherein the non-transitory computer-readable storage medium further comprises instructions which when executed by the one or more processors, cause the one or more processors arranged to identify whether non-availability of the component results in partition of the first routing domain and to send the advertisement of the second network repair address to one or more far-side nodes via the external path in that event.

5. An apparatus as claimed in claim 4, wherein the non-transitory computer-readable storage medium further comprises instructions which when executed by the one or more processors, cause the one or more processors further arranged to perform an incremental path calculation Shortest Path First (SPF) with the non-available component removed and, if a far-side component does not reattach, identify non-availability of the component as resulting in partition of the first routing domain.

6. An apparatus as claimed in claim 4, wherein the non-transitory computer-readable storage medium further comprises instructions which when executed by the one or more processors, cause the one or more processors further arranged to identify whether the apparatus is the nearest node to the non-available component.

7. An apparatus as claimed in claim 4, wherein the non-transitory computer-readable storage medium further comprises instructions which when executed by the one or more processors, cause the one or more processors further arranged to detect whether the non-available component is non-unidirectional and, in that event, to advertise the second network repair address to one or more far-side nodes the external path.

8. An apparatus as claimed in claim 3, wherein the non-transitory computer-readable storage medium further comprises instructions which when executed by the one or more processors, cause the one or more processors further being arranged to instigate a repair at a far-side component to the non-available component and forward repair traffic to the second network repair address via the external path.

9. An apparatus as claimed in claim 8 in which the repair is maintained until an inter-routing domain path is provided between the first and second advertising nodes.

10. An apparatus as claimed in claim 1, wherein the non-transitory computer-readable storage medium further comprises instructions which when executed by the one or more processors, cause the one or more processors further arranged to receive an advertisement of the second network repair address from the external path and advertise the network repair address into the first routing domain.

11. An apparatus as claimed in claim 10, wherein the non-transitory computer-readable storage medium further comprises instructions which when executed by the one or more processors, cause the one or more processors arranged to advertise the network repair address into the first routing domain using an Interior Gateway Protocol (IGP).

12. An apparatus as claimed in claim 1 in which the advertisement of the near-side advertising node network repair address via the path external to the first routing domain is via external Border Gateway Protocol (eBGP).

13. An apparatus as claimed in claim 12 in which the eBGP advertisement is identified as a network repair address to be advertised back into the first routing domain using a community attribute.

14. An apparatus as claimed in claim 1, wherein the first routing domain comprises an Autonomous System (AS).

15. A method of constructing a repair path in the event of non-availability of an routing domain component of a first routing domain comprising, as components, links and nodes, the method comprising the steps performed at a routing domain border node of, in the event of non-availability of the routing domain component between a first advertising node and a second advertising node, receiving a first network repair address from the first advertising node and a second network repair address from the second advertising node; determining an external path that comprises an external node that resides in a second routing domain that is external to the first routing domain; and advertising the second network repair address to one or more nodes coupled to the first advertising node via the external path.

16. The method of claim 15 wherein the non-available component comprises a node or a link.

17. The method of claim 15, further comprising, in the event of non-availability of the routing domain component, partitioning the first routing domain into far-side components unreachable from the routing domain border node by a path within the routing domain and near-side components reachable from the routing domain border node by a path within the first routing domain.

18. The method of claim 15 further comprising receiving an advertisement of the second network repair address from the external path and advertise the network repair address into the first routing domain.

19. The method of claim 15 in which the advertisement of the near-side advertising node network repair address via the path external to the first routing domain is via external Border Gateway Protocol (eBGP).

20. The method of claim 15, wherein the first routing domain comprises an Autonomous System (AS).

21. A non-transitory computer readable volatile or non-volatile storage medium of storing instructions for constructing a repair path which, when executed by one or more processors, cause one or more processors to perform:
in the event of non-availability of a routing domain component of a first routing domain between a first advertising node and a second advertising node, receiving a first network repair address from the first advertising node and a second network repair address from the second advertising node;
determine an external path that comprises an external node that resides in a second routing domain that is external to the first routing domain; and
advertising the second network repair address to one or more nodes coupled to the first advertising node via the external path;
wherein each routing domain comprises, as components, links and nodes.

22. The non-statutory computer-readable volatile or non-volatile medium storage of claim 21 wherein the non-available component comprises a node or a link.

23. The non-statutory computer-readable volatile or non-volatile storage medium of claim 21 further comprising instructions which when executed by the one or more processors, causes the one or more processors to perform, in the event of non-availability of the routing domain component, partitioning the first routing domain into far-side components unreachable by a path within the routing domain and near-side components reachable by a path within the first routing domain.

24. The non-statutory computer-readable volatile or non-volatile storage medium of claim 21 further storing instructions, which, when executed by the one or more processors, causes the one or more processors to receive an advertisement of the second network repair address from the external path and advertising the network repair address into the first routing domain.

25. The non-statutory computer-readable volatile or non-volatile storage medium of claim 21 in which the advertisement of the near-side advertising node network repair address via the path external to the first routing domain is via external Border Gateway Protocol (eBGP).

26. The non-statutory computer-readable volatile or non-volatile storage medium of claim 21, wherein the first routing domain comprises an Autonomous System (AS).

* * * * *

UNITED STATES PATENT AND TRADEMARK OFFICE
CERTIFICATE OF CORRECTION

PATENT NO. : 7,697,416 B2
APPLICATION NO. : 11/518382
DATED : April 13, 2010
INVENTOR(S) : Mike Shand et al.

It is certified that error appears in the above-identified patent and that said Letters Patent is hereby corrected as shown below:

COLUMN 11
Claim 1, line 60: Delete "non-statutory" and insert --non-transitory--.

COLUMN 12
Claim 1, line 3: Delete "determine" and insert --determining--.
Claim 4, line 20: Delete "arranged".
Claim 5, line 28: Delete "further arranged".
Claim 6, line 27: Delete "further arranged."
Claim 7, line 43: Delete "further arranged."
Claim 7, lines 44-45: Delete "non-uni-directional" and insert --non-unidirectional--.
Claim 8, lines 50-51: Delete "further being arranged".
Claim 10, line 60: Delete "further arranged".
Claim 11, line 67: Delete "arranged".

COLUMN 14
Claim 21, line 11: Delete "determine" and insert --determining--.
Claim 22, line 19: Delete "non-statutory" and insert --non-transitory--.
Claim 23, line 22: Delete "non-statutory" and insert --non-transitory--.
Claim 24, line 31: Delete "non-statutory" and insert --non-transitory--.
Claim 25, line 38: Delete "non-statutory" and insert --non-transitory--.
Claim 26, line 43: Delete "non-statutory" and insert --non-transitory--.

Signed and Sealed this

Eighth Day of June, 2010

David J. Kappos
*Director of the United States Patent and Trademark Office*